United States Patent
Abe et al.

(10) Patent No.: US 7,937,041 B2
(45) Date of Patent: May 3, 2011

(54) SHARED FREQUENCY TRANSMITTER

(75) Inventors: Tetsushi Abe, Yokohama (JP); Hui Shi, Yokosuka (JP); Takahiro Asai, Yokosuka (JP); Hitoshi Yoshino, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 384 days.

(21) Appl. No.: 11/215,041

(22) Filed: Aug. 31, 2005

(65) Prior Publication Data
US 2006/0050811 A1 Mar. 9, 2006

(30) Foreign Application Priority Data
Sep. 6, 2004 (JP) .................................. 2004-258472

(51) Int. Cl.
*H04B 15/00* (2006.01)
(52) U.S. Cl. ........... 455/63.1; 455/65; 455/69; 375/296; 375/346
(58) Field of Classification Search ............... 455/63.1, 455/39, 41.2, 114.2, 278.1, 296, 501, 570, 455/424, 425, 456.5, 456.6, 561, 550.1, 575.1, 455/506, 500, 67.13, 71, 69; 375/341, 346, 375/296, 299; 370/331, 335
See application file for complete search history.

(56) References Cited

U.S. PATENT DOCUMENTS

| | | | | |
|---|---|---|---|---|
| 7,020,451 B2 * | 3/2006 | Sugar et al. | .................... | 455/323 |
| 7,164,918 B2 * | 1/2007 | Moulsley et al. | ............. | 455/450 |
| 7,209,716 B2 * | 4/2007 | Maeda et al. | ................. | 455/119 |
| 7,248,638 B1 * | 7/2007 | Banister | ......................... | 375/267 |
| 2002/0080728 A1 * | 6/2002 | Sugar et al. | .................... | 370/252 |
| 2002/0118784 A1 * | 8/2002 | Teo et al. | ....................... | 375/349 |
| 2003/0123565 A1 * | 7/2003 | Fukuda et al. | ................. | 375/267 |
| 2003/0214917 A1 * | 11/2003 | Molisch et al. | ............... | 370/286 |
| 2004/0165675 A1 * | 8/2004 | Ito et al. | ......................... | 375/267 |
| 2004/0178886 A1 * | 9/2004 | Watanabe et al. | ............ | 340/10.1 |
| 2004/0208140 A1 * | 10/2004 | Noguchi et al. | ............... | 370/328 |
| 2006/0114826 A1 * | 6/2006 | Brommer | ....................... | 370/230 |
| 2006/0120436 A1 * | 6/2006 | Komatsu | ........................ | 375/144 |

FOREIGN PATENT DOCUMENTS

| | | |
|---|---|---|
| EP | 1 467 518 A1 | 10/2004 |
| JP | 9-121193 | 5/1997 |
| JP | 11-340910 | 12/1999 |
| JP | 2001-177468 | 6/2001 |
| JP | 2001-339758 | 12/2001 |
| JP | 2003-219459 | 7/2003 |
| JP | 2003-264876 | 9/2003 |
| JP | 2004-194213 | 7/2004 |
| WO | WO 01/73956 A2 | 10/2001 |
| WO | WO 03/047174 * | 5/2003 |
| WO | WO 03/047174 A1 | 6/2003 |

* cited by examiner

*Primary Examiner* — Duc Nguyen
*Assistant Examiner* — Charles Chow
(74) *Attorney, Agent, or Firm* — Oblon, Spivak, McClelland, Maier & Neustadt, L.L.P.

(57) ABSTRACT

A shared frequency transmitter for use in a network environment where transmitters and receivers of plural radio communication systems in which the same frequency is used exist is disclosed. The shared frequency transmitter includes (a) a communicating unit configured to detect peripheral transmitters existing in a peripheral area, and to exchange information with the detected peripheral transmitters; and (b) a signal generating unit configured to generate a transmit signal by applying an interference cancellation technique based on the information obtained through the exchange of information.

13 Claims, 11 Drawing Sheets

| | EXAMPLE 1 | EXAMPLE 2 | EXAMPLE 3 | EXAMPLE 4 |
|---|---|---|---|---|
| SYSTEM1 | IEEE.11a PROVIDER A | W-CDMA OPERATOR A | W-CDMA OPERATOR A | W-CDMA OPERATOR A |
| SYSTEM2 | IEEE.11a PROVIDER B | W-CDMA OPERATOR B | PHS OPERATOR A | IEEE.11a PROVIDER B |

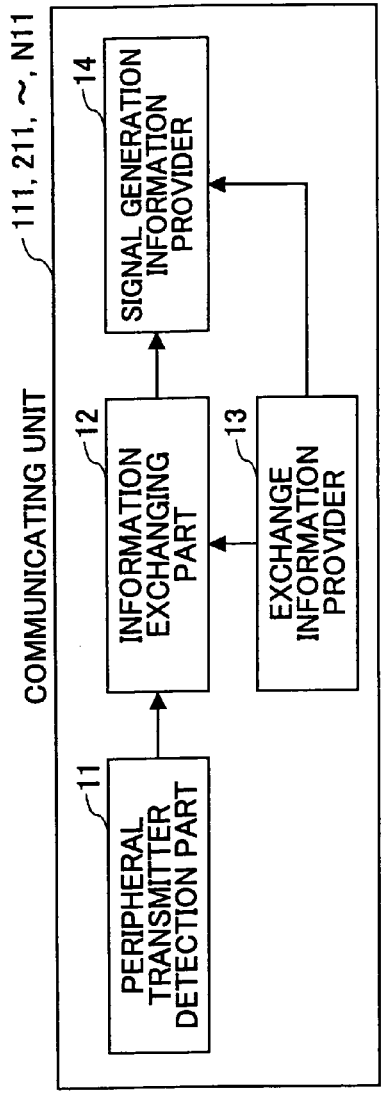

FIG.5

| | EXAMPLE 1 | EXAMPLE 2 |
|---|---|---|
| CONTENTS OF INFORMATION TO BE EXCHANGED | •INFORMATION BIT STRING (INFORMATION SYMBOL) <br>•TRANSMISSION PATH INFORMATION <br>•PILOT SIGNAL <br>•SYNCHRONIZATION INFORMATION <br>•INFORMATION ON SIGNAL GENERATING METHOD <br>•PARAMETER REQUIRED TO GENERATE TRANSMIT SIGNALS (•MODULATION SCHEME INFORMATION •RADIO-FREQUENCY BANDWIDTH INFORMATION •CENTER FREQUENCY INFORMATION) | •PILOT SIGNAL |
| TECHNIQUES FOR GENERATION OF SIGNALS ON TRANSMISSION SIDE | MIMO PRECODING <br>EX. •TRANSMISSION ZF <br>•TH PRECODING | INSERTION OF COMMON PILOT SIGNAL |
| TECHNIQUES FOR DECODING ON RECEPTION SIDE | •NOTHING TO BE DONE <br>•SYNCHRONOUS DETECTION <br>•OTHER INTERFERENCE CANCELLATION TECHNIQUES | INTERFERENCE CANCELLATION TECHNIQUE USING OTHER SYSTEM CHANNELS <br>EX. •ML <br>•MMSE |

FIG.6

SHARED FREQUENCY TRANSMITTER

FIELD OF THE INVENTION

The present invention generally relates to a shared frequency transmitter used in a network environment where plural radio communication systems are mixed.

BACKGROUND OF THE INVENTION

With the recent explosive increase in demand for radio communications, the variety of radio communication methods as well as the number of radio communication enterprises have increased. In addition, broadening the frequency band for a wireless communication systems is being promoted correspondingly, whereby the frequency band available for radio communication dries up.

Considering this trend, recently a solution in which plural systems share the same frequency band has been proposed and reduced to practice. For example, there is a frequency band as referred to as an ISM (Industrial Scientific Medical) band. As for this frequency band, a radio license is unnecessary, and many radio communication enterprises such as wireless LAN (Local Area Network) enterprises use this band to provide their communication services. There is a possibility that sharing of frequency bands between the plural systems will find increasing use from now on.

FIG. 1 is a diagram showing an example of a method of sharing frequency bands between plural systems. Referring to FIG. 1, according to example 1, the plural systems are defined as different wireless LAN enterprises "provider A" and "provider B" which use the same wireless interface "IEEE.11a". Similarly, according to example 2, the plural systems are defined as two enterprises "operator A" and "operator B" which use the same wireless interface "W-CDMA" (Wideband Code Division Multiple Access). According to example 3, the plural systems are defined as different wireless interfaces "W-CDMA" and "PHS" (Personal Handyphone System) within the same enterprise "operator A". According to example 4, the plural systems are defined as different enterprises "operator A" and "provider B" which also use different wireless interfaces "W-CDMA" and "IEEE.11a", respectively. In this way, various definitions can be considered as plural systems.

By the way, a problem that occurs when the plural systems share the same frequency is interference between systems. In order to assure a certain level of communications quality in each system, a technique for preventing interference (interference cancellation technique) becomes necessary.

Here, with reference to FIG. 2, an interference cancellation technique used in existing wireless LAN systems is explained as an example.

FIG. 2 is a diagram showing a conventional configuration of transmitters and receivers under the circumstance where plural systems coexist, in which systems 1, 2 ... N indicate wireless communication systems provided by different wireless LAN enterprises, respectively. Each system is provided with a transmitter 101 including a signal generating section 102 and a timeslot allocating section 103, and a receiver 105 including an antenna 106 and a decoder 107 and opposed to the transmitter 101. It is noted that the transmitters 101 of the respective systems 1, 2 ... N are connected to a wired network NW such as the Internet.

Although these systems 1, 2 ... N use the same frequency band, interference between systems is prevented as follows; each transmitter 101 detects that the transmitters 101 of other systems are not in operation for transmission, by using protocols such as CSMA-CA (Carrier Sense Multiple Access-Collision Avoidance). The transmitter 101 transmits data to the corresponding receiver 105, if other transmitters 101 are not in operation for transmission. In this way, it is possible to implement time division of communications between systems and thus prevent interference between systems.

However, according to the aforementioned prior art in which interference between systems is prevented by using protocols such as CSMA-CA, the communications between systems is performed according to a time division scheme, so there is a problem in that frequency use efficiency per system decreases 1/N times with respect to the case of only one system at a time allocated for a frequency band. FIG. 3 is a diagram showing a frequency use situation by each system on a time axis. It is shown that only one system can utilize the frequency band at the same time.

Therefore, there is a need for a technique which improves the frequency use efficiency, since it is likely that the number of the radio communication enterprises (=the number of systems N) will increase further.

SUMMARY OF THE INVENTION

Therefore, it is an object of the present invention to solve the problems in the conventional techniques and to provide a shared frequency transmitter that can effectively remove interference between systems and greatly improve frequency use efficiency under the circumstance where transmitters and receivers of the plural systems sharing the same frequency coexist.

In order to solve the problems, according to one aspect of the invention, a shared frequency transmitter for use in a network environment where transmitters and receivers of plural radio communication systems in which the same frequency is used exist, which comprises:
(a) a communicating unit configured to detect peripheral transmitters existing in a peripheral area, and to exchange information with the detected peripheral transmitters; and
(b) a signal generating unit configured to generate a transmit signal by applying an interference cancellation technique based on the information obtained through the exchange of information.

In this aspect, the communicating unit may exchange information with the peripheral transmitters via wireless communication media.

Further, the communicating unit may exchange information with the peripheral transmitters via wired communication media.

Further, the communicating unit may exchange information with the peripheral transmitters centrally, using a data collection device provided on the network and configured to collect data.

Further, the respective transmitters may be divided into plural groups by system, and the communicating unit may exchange information with a particular group(s) of transmitters among plural groups of transmitters.

Further, the information to be exchanged may include at least one of an information bit string, transmission path information (such as phase and amplitude), a pilot signal, synchronization information, information on the method of generating signals, and a parameter required to generate the transmit signal.

Further, the information to be exchanged may include at least one of information on a modulation scheme, information on a radio-frequency bandwidth, and information on a center frequency.

Further, a parameter required to generate the transmit signal may be calculated by one or more transmitters on the network.

Further, a parameter required to generate the transmit signal may be calculated by a data collection device provided on the network.

Further, the shared frequency transmitter according to this aspect may further comprise means for integrating pilot signals of the respective systems into information to be exchanged;

means for estimating direct transmission path information concerning the transmission path having a transmitter of its own at one end based on the pilot signals; and means for acquiring indirect transmission path information concerning the transmission path not having a transmitter of its own at one end from other systems, wherein the transmit signal is generated by applying an interference cancellation technique based on the direct transmission path information and the indirect transmission path information.

In another aspect of the invention, a method of transmission with a shared frequency in a network environment where transmitters and receivers of plural radio communication systems in which the same frequency is used exist, comprises the steps of:

(a) detecting peripheral transmitters existing in a peripheral area;

(b) exchanging predetermined information with the detected peripheral transmitters; and (c) generating a transmit signal by applying an interference cancellation technique based on the information obtained through the exchanging step.

With the aforementioned aspects of the invention, since exchanging of information is performed between transmitters of the plural systems and various interference cancellation techniques become available on the transmission side based on the acquired information, it is possible to effectively cancel interference between systems and remarkably improve frequency use efficiency.

BRIEF DESCRIPTION OF THE DRAWINGS

Other objects, features, and advantages of the invention will become more apparent from the following detailed description when read in conjunction with the accompanying drawings, in which

FIG. 5 is a diagram showing a configuration of the communicating units within the transmitters;

FIG. 6 is a diagram showing an example of transmission and reception techniques used for exchanging information and interference cancellation between systems;

DETAILED DESCRIPTION OF THE PREFERRED EMBODIMENT

The present invention is described in detail below in conjunction with the attached drawings.

Figure 4:
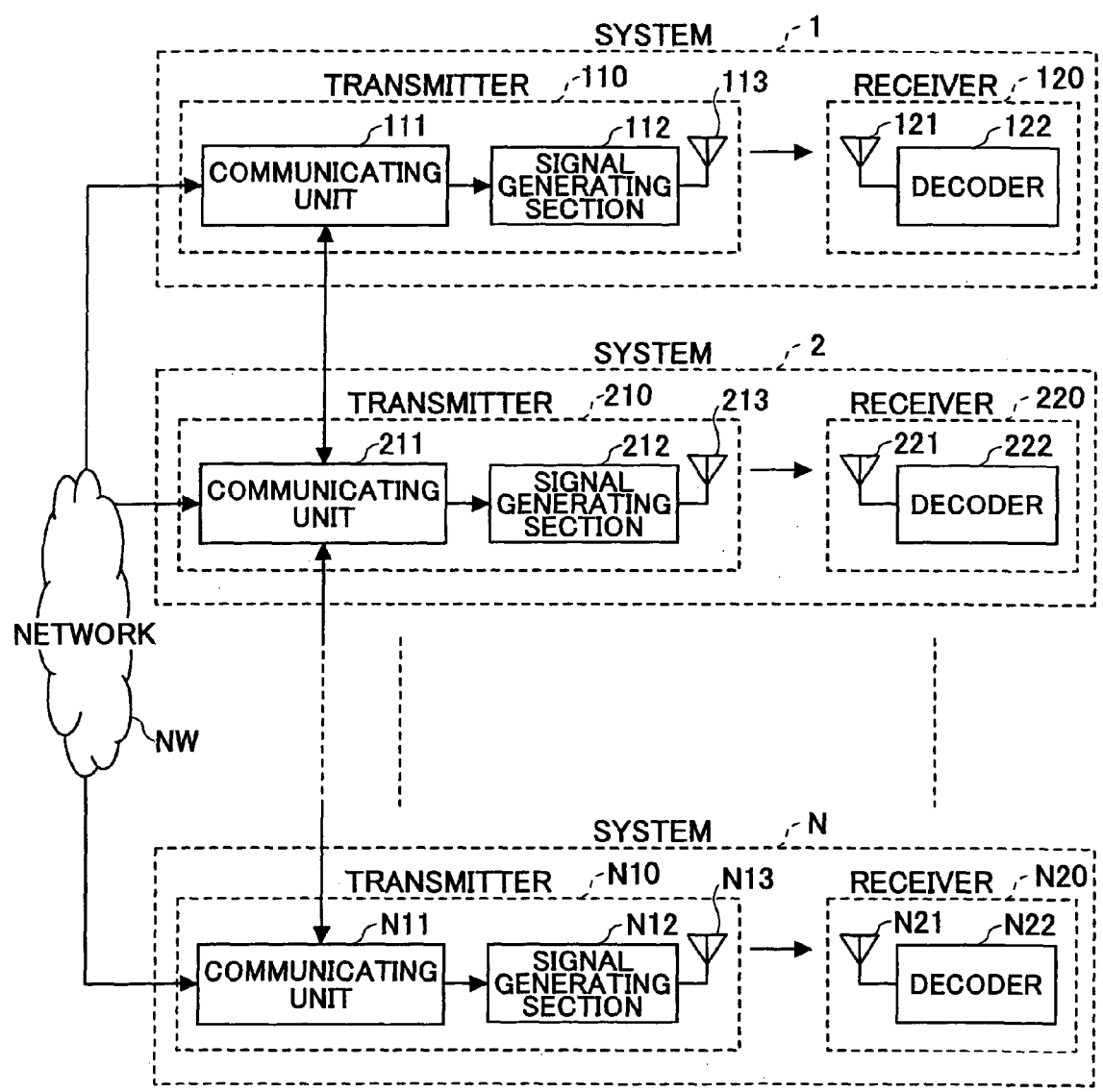
FIG. 4 is a diagram showing an example of a configuration of transmitters and receivers under the circumstance where plural systems are mixed, according to the first embodiment of the present invention.

FIG. 4 is a diagram showing an example of a configuration of transmitters and receivers under the circumstance where plural systems coexist, according to the first embodiment of the present invention. In FIG. 4, systems 1, 2 . . . N indicate wireless communication systems provided by different wireless LAN enterprises using the same frequency band. The respective systems 1, 2 . . . N are provided with transmitters 110, 210 . . . N10 connected to a wired network NW such as the Internet, and receivers 120, 220 . . . N20 opposed to these transmitters, respectively. The respective transmitters 110, 210 . . . N10 are provided with communicating units 111, 211 . . . N11 having functions of detecting (searching for) peripheral transmitters in a peripheral area and communicating with the detected peripheral transmitters to exchange information, signal generating units 112, 212 . . . N12 configured to generate transmit signals by applying an interference cancellation technique based on the information obtained through the exchange of information, and antennas 113, 213 . . . N13, respectively. The receivers 120, 220 . . . N20 are provided with antennas 121, 221 . . . N21, and decoders 122, 222 . . . N22 that decode received signals. It is noted that systems 1, 2 . . . N are also equipped with functions of transmitting signals from the receivers 120, 220 . . . N20 to the transmitters 110, 210 . . . N10.

FIG. 5 is a diagram showing a configuration of the respective communicating units 111, 211 . . . N11 within the transmitters 110, 210 . . . N10. Each of the communicating units 111, 211 . . . N11 includes a peripheral transmitter detection part 11 configured to search for and detect the transmitters of other systems existing in a peripheral area, an information exchanging part 12 configured to exchange information with the detected peripheral transmitters, an exchange information provider 13 configured to hold the exchange information of its own to be exchanged or generate such information if necessary and to provide it to the information exchanging part 12, and a signal generation information provider 14 configured to provide the signal generating unit 112, 212 . . . or N12 with information necessary for interference cancellation in generating signals based on the exchange information acquired from other systems and the exchange information of its own if necessary. It is noted that the exchange information provider 13 and the signal generation information provider 14 may be provided in any units other than the communicating units 111, 211 ... N11.

FIG. 6 is a diagram showing an example of transmission and reception techniques used for exchanging information and interference cancellation between systems. In the case of application between systems having the same wireless interface, as is the case of example 1 or example 2 of FIG. 1, as the exchange information to be shared, an information bit string (an information symbol) transmitted from the transmitter to the receiver, transmission path information between the respective transmitter and receiver, a pilot signal as a reference, synchronization information, information on the method of generating signals, a parameter required to generate the transmit signal, etc., are conceivable. In this case, as a technique for generating signals on the transmission side, for example, transmission ZF (Zero Forcing) or TH (Tomlinson-Harashima) preceding, which is used for MIMO (Multiple Input Multiple Output) preceding, is conceivable, and as a technique used for decoding on the reception side, synchronous detection or another interference cancellation technique is conceivable, other than the case of doing nothing in particular. It is noted that transmission path information can be made available on the transmission side by configuring each receiver to transmit the pilot signal to the transmitter in the case of TDD (Time Division Duplex) in which up and down communications are divided by time, while transmission path information can be made available by configuring each receiver to feed the transmission path information back to the transmitter in the case of FDD (Frequency Division Duplex) in which up and down communications are divided by frequency. In addition, in the case of the plural systems using different wireless interfaces, as in the case of example 3 or example 4 of FIG. 1, it is conceivable to add information on a modulation scheme, information on a radio-frequency bandwidth, information on a center frequency, etc., as exchange information to be shared.

On the other hand, in the case where it is impossible to share the aforementioned exchange information, it is conceivable that only pilot signals may be used as information to be exchanged, in which a technique for inserting common pilot signals on the transmission side for this purpose is used, while in the reception side ML (Maximum Likelihood), MMSE (Minimum Mean Squared Error) or the like is used as an interference cancellation technique using other system channels, as shown in example 2 of FIG. 6.

The arrangement according to the first embodiment shown in FIG. 4 and FIG. 5 is operated as follows: the transmitters 110, 210 ... N10 of the respective systems 1, 2 ... N search for peripheral transmitters of other systems by means of the peripheral transmitter detection parts 11, and exchange information with the detected transmitters of other systems by means of the exchange information provider 13. At this time, the information to be provided from its own side is provided by the exchange information provider 13. It is processed if necessary in the signal generation information provider 14 based on the acquired information, and then in the signal generation information provider 14 the generation of transmit signals is performed applying interference cancellation techniques mainly based on transmission path information, and then transmit signals are transmitted through antennas 113, 213 ... N13.

When the receivers 120 220 ... N20 of the respective systems 1, 2 ... N receive the signals through antennas 121, 221 ... N21, the signals are decoded in the decoders 122, 222 ... N22. At this time, it is possible for the receivers 120 220 ... N20 to retrieve only the signal addressed to oneself transmitted from the transmitter of its own system, because the interference cancellation technique is applied on the transmission side based on the information exchanged between systems.

Figures 1, 2:
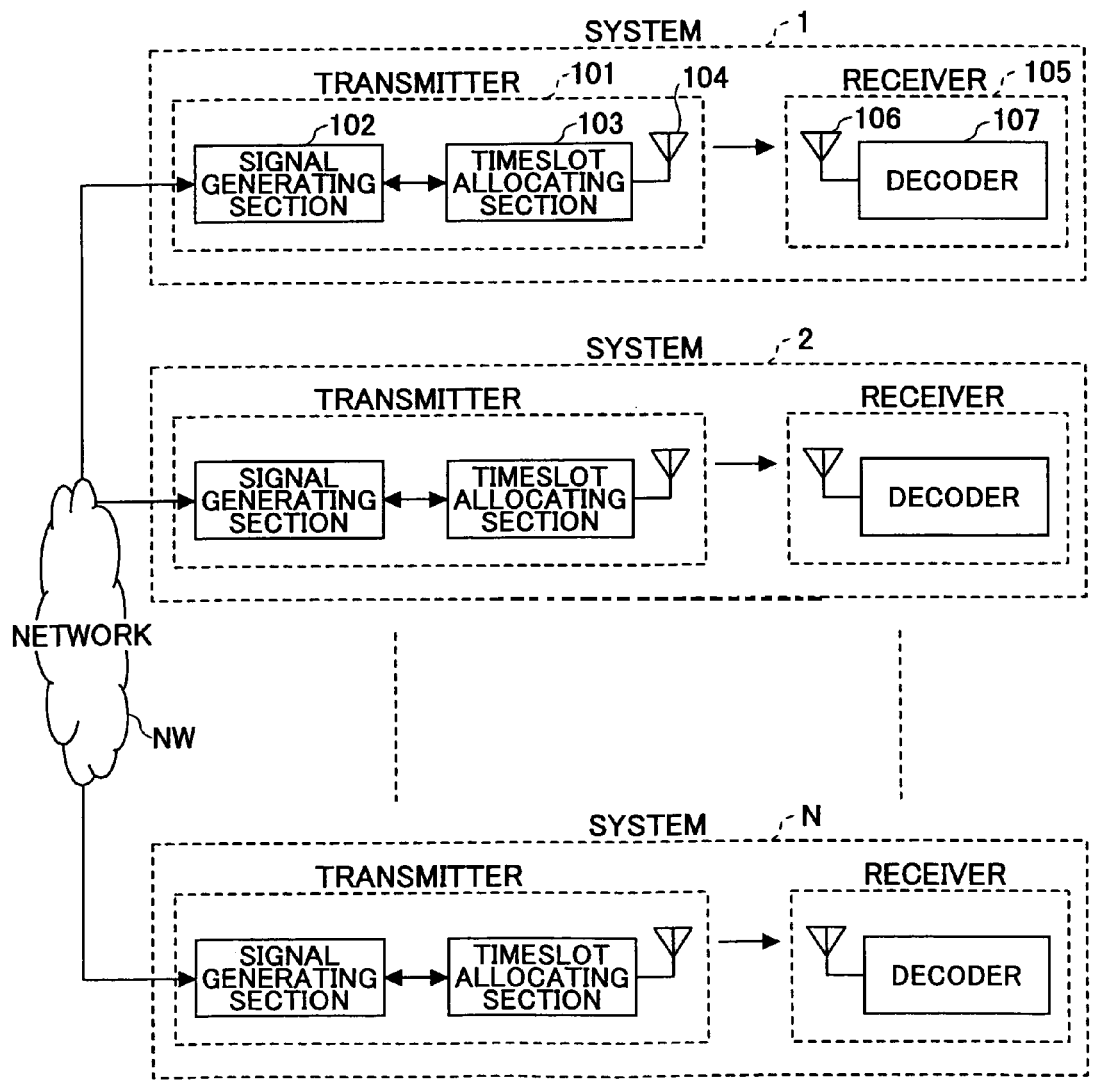
FIG. 1 is a diagram showing an example of a way of sharing frequencies between plural systems.
FIG. 2 is a diagram showing a conventional configuration of transmitters and receivers.
Figure 3:
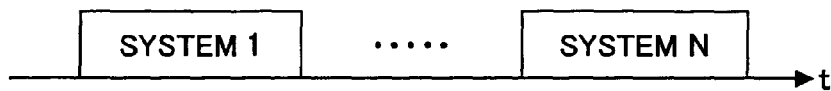
FIG. 3 is a diagram showing a frequency use situation by each system on a time axis.
Figure 7:
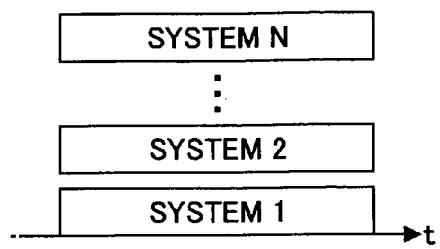
FIG. 7 is a diagram showing a frequency use situation by each system on a time axis according to the first embodiment.

As described above, according to the present invention, information is exchanged between transmitters of the plural systems and various interference cancellation techniques become available on the transmission side based on the exchanged information. In this way, according to the present invention, it is possible to remarkably improve frequency use efficiency in comparison with in the case of the aforementioned prior art (FIG. 1). FIG. 7 is a diagram showing a frequency use situation by each system on a time axis according to the first embodiment. It is shown that plural systems can communicate at the same time without using a time division scheme, and thus frequency use efficiency can be remarkably improved.

Figure 18:
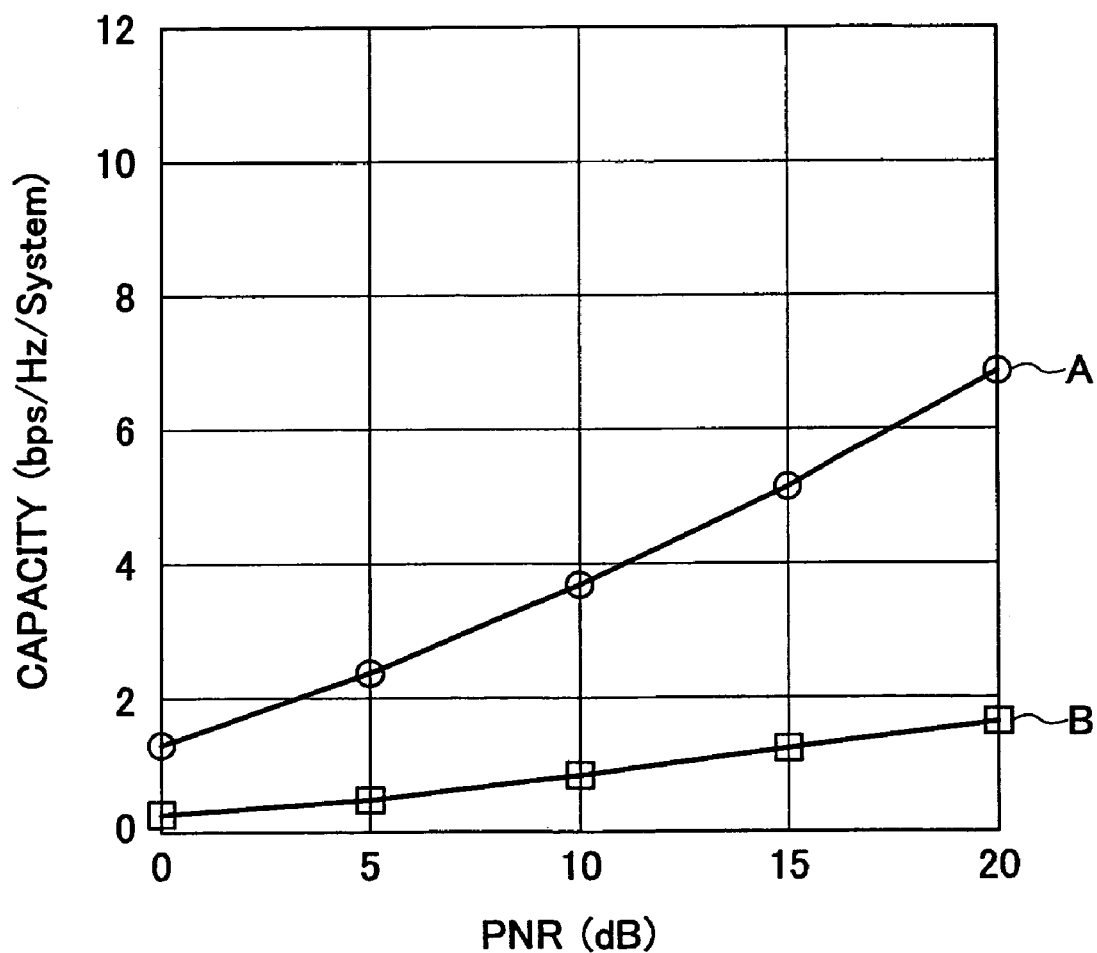
FIG. 18 a diagram showing an example of frequency use efficiency.

FIG. 18 is a diagram showing an example of frequency use efficiency per system in the case of four systems sharing the same frequency band. It is assumed that in each system one transmission and one reception type antenna are used and transmission power is fixed. The horizontal axis PNR represents transmission power-to-noise ratio (dB) and the vertical axis Capacity represents frequency use efficiency (bps/Hz/System).

Curve A represents frequency use efficiency in the case of the present invention being applied in which transmitters of the respective systems exchange transmission path information and information symbols and generate transmit signals using TH preceding. For comparative purposes, frequency use efficiency in the case of each system communicating using the time division scheme is represented by curve B. It can be understood that it is possible to improve frequency use efficiency by exchanging information between transmitters of the respective systems and applying interference cancellation techniques on the transmission side.

Next, a description is made of an example in which FZ transmission is used as an interference cancellation technique.

Figure 8:
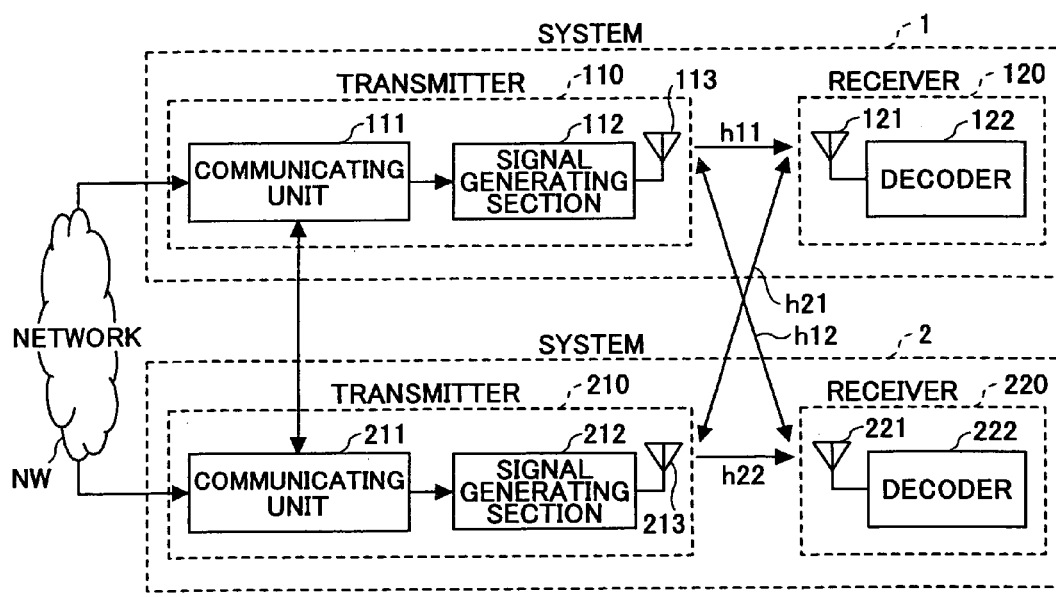
FIG. 8 is a diagram showing the configuration simplified for purposes of explanation for the case where interference cancellation is performed through the acquisition of transmission path information.

FIG. 8 is a diagram of the configuration simplified for purposes of explanation for the case where interference cancellation is performed through the acquisition of transmission path information. It is noted that the same goes for the case of the number of the systems being N, as a matter of course.

In FIG. 8, the configurations of the system 1 and the system 2 are the same as those shown in FIG. 4. As for a transmission path value representative of the status of a transmission path, h11 indicates a transmission path value between transmitter 110 and receiver 120 of system 1, h12 indicates a transmission path value between transmitter 110 of system 1 and receiver 220 of system 2, h21 indicates a transmission path value between transmitter 210 of system 2 and receiver 120 of system 1 and h22 indicates a transmission path value between transmitter 210 and receiver 220 of system 2. It is noted that the transmission path values h11, h12, h21 and h22 are complex number.

Figure 9:
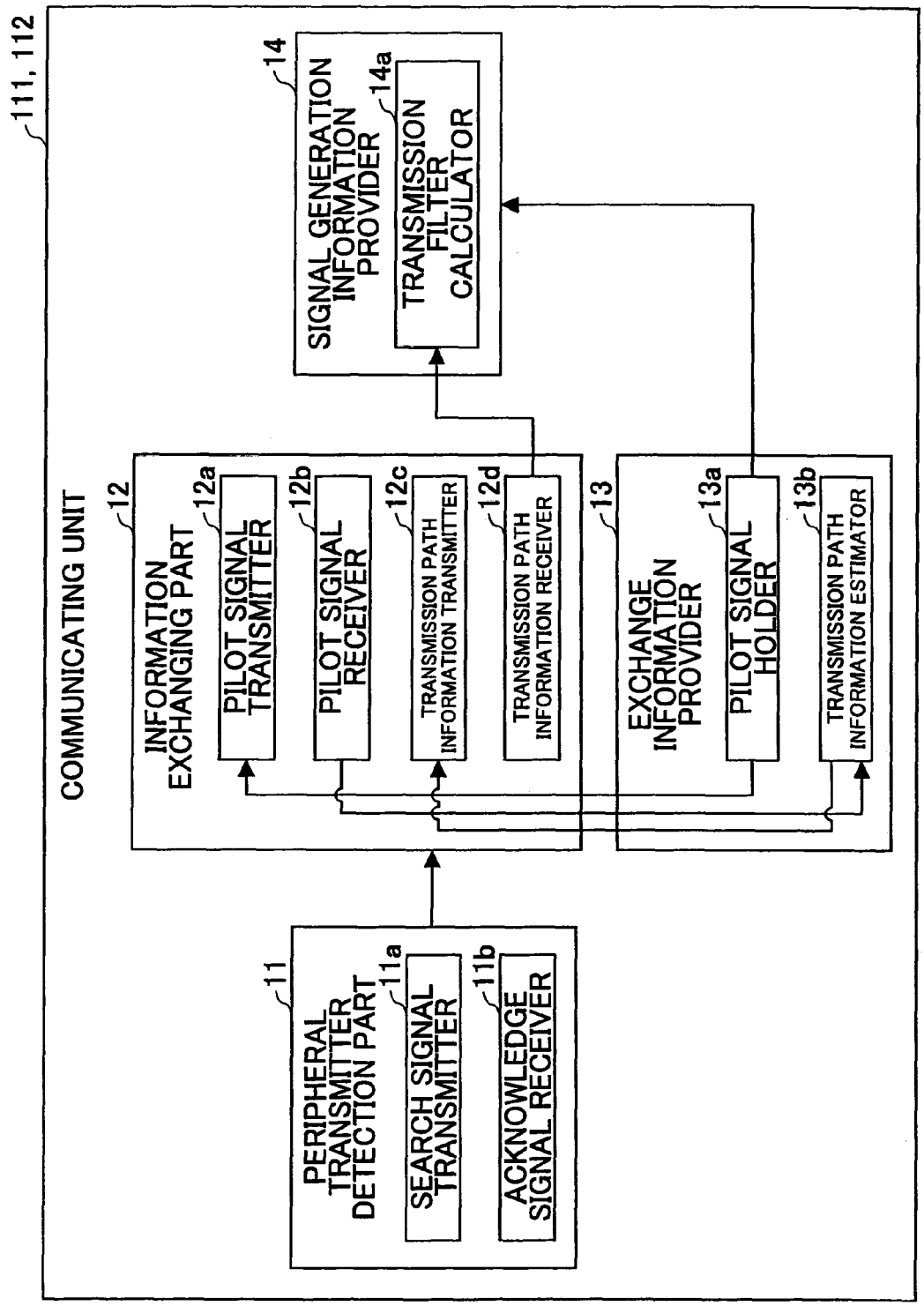
FIG. 9 is a diagram showing the configuration of communicating units in the case where interference cancellation is performed through the acquisition of transmission path information.

FIG. 9 is a diagram showing the configuration of communicating units 111, 211 in the case where interference cancellation is performed through the acquisition of transmission path information. The peripheral transmitter detection part 11 is provided with a search signal transmitter 11a configured to transmit a search signal to the peripheral transmitters and an acknowledge signal receiver 11b configured to receive an acknowledge signal which is a response to the search signal from a peripheral transmitter. The information exchanging part 12 is provided with a pilot signal transmitter 12a configured to transmit a pilot signal to the peripheral transmitters, a pilot signal receiver 12b configured to receive pilot signals from the peripheral transmitters, a transmission path information transmitter 12c configured to transmit transmission path information to the peripheral transmitters, and a transmission path information receiver 12d configured to receive transmission path information from the peripheral transmitters.

The exchange information provider 13 is provided with a pilot signal holder 13a configured to provide a pilot signal to pilot signal transmitter 12a of information exchanging part 12, and a transmission path information estimator 13b configured to estimate transmission path information based on the pilot signals received by the pilot signal receiver 12b of the information exchanging part 12 and to provide the estimated information as the exchange information to the transmission path information transmitter 12c. The signal generation information provider 14 is provided with a transmission filter calculator 14a configured to calculate filter taps of a transmit filter for interference cancellation, based on indirect transmission path information of the transmission path not having the transmitter of its own at one end, which is received by the transmission path information receiver 12d of the information exchanging part 12, and direct transmission path information of the transmission path having the transmitter of its own at one end, which is estimated by the exchange information provider 13.

Figure 10:
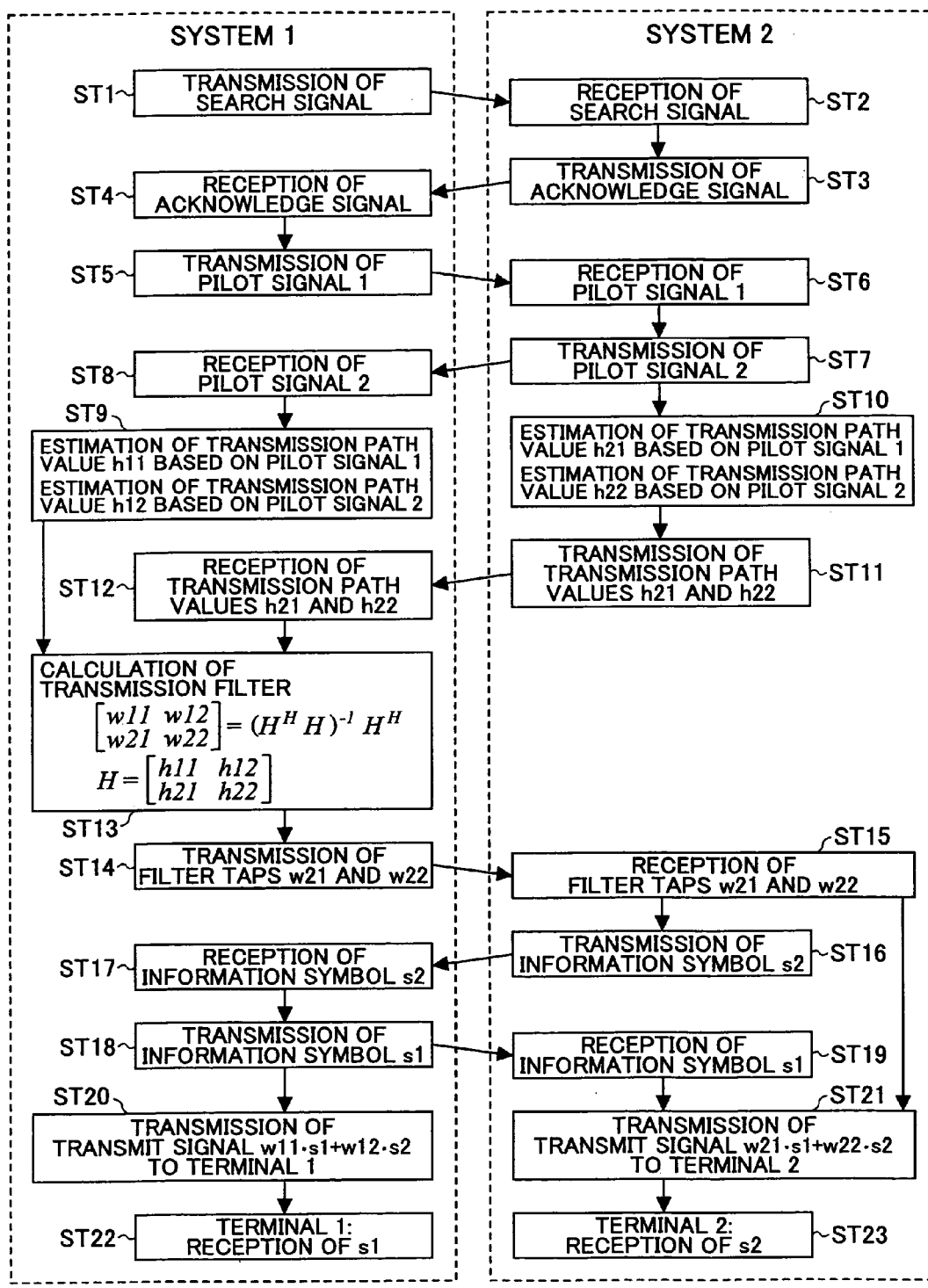
FIG. 10 is a flowchart showing processing in the case where interference cancellation is performed through the acquisition of transmission path information.

FIG. 10 is a flowchart showing processing in the case where interference cancellation is performed through the acquisition of transmission path information. Operations are explained below in accordance with this flowchart.

At first, in FIG. 10, communication between transmitters is established by a search signal (steps ST1 through ST4).

Then, the pilot signals are exchanged between transmitters (steps ST5 through ST8), and the transmission path values are estimated (steps ST9 and ST10). In other words, in the system 1 the transmission path value h11 is estimated based on the pilot signal of the system of its own and the transmission path value h12 is estimated based on the pilot signal from the system 2, while in the system 2 the transmission path value h21 is estimated based on the pilot signal from the system 1 and the transmission path value h22 is estimated based on the pilot signal of the system of its own. Then, the estimated transmission path values are transmitted as the exchange information from the system 2 to the system 1 (step ST11), which are received by system 1 (step ST12).

In the system 1, ZF filter taps are calculated (step ST13) based on the transmission path values received from the system 2 (indirect transmission path information) and the transmission path values estimated by the system 1 on its own (direct transmission path information), using the following equation (1).

$$\begin{bmatrix} w11 & w12 \\ w21 & w22 \end{bmatrix} = (H^H \ H)^{-1} H^H \quad (1)$$

Here, a transmission path matrix H is defined as the following equation (2) using the aforementioned transmission path values h11, h12, h21 and h22.

$$H = \begin{bmatrix} h11 & h12 \\ h21 & h22 \end{bmatrix} \quad (2)$$

Then, among calculated ZF filter taps, w21 and w22 to be used in the system 2 are transmitted to the system 2 (step ST14), which are received by the system 2 (step ST15).

Then, information symbols s1 and s2 to be transmitted are exchanged between system 1 and system 2 (steps ST16 through ST19).

Then, the respective systems 1 and 2 generate transmit signals by performing weighted summing of the information symbols s1 and s2 using the corresponding ZF filter tap and transmit the transmit signals thus generated (steps ST20 and ST21).

Here, assuming that x1 is the transmit signal of the system 1 and x2 is the transmit signal of the system 2, x1 and x2 are can be expressed as the following equation (3).

$$\begin{bmatrix} x1 \\ x2 \end{bmatrix} = (H^H \ H)^{-1} H^H \begin{bmatrix} s1 \\ s2 \end{bmatrix} = \begin{bmatrix} w11 \cdot s1 + w12 \cdot s2 \\ w21 \cdot s1 + w22 \cdot s2 \end{bmatrix} \quad (3)$$

Then, the transmit signal transmitted from each of the systems 1 and 2 is received by the corresponding receiver (steps ST22 and ST23).

Here, assuming that r1 is the signal received by the receiver of system 1 and r2 is the signal received by the receiver of system 2, r1 and r2 can be expressed as the following equation (4). It is noted that n1 and n2 represent noise introduced in antennas.

$$\begin{bmatrix} r1 \\ r2 \end{bmatrix} = H \begin{bmatrix} x1 \\ x2 \end{bmatrix} + \begin{bmatrix} n1 \\ n2 \end{bmatrix} \quad (4)$$

$$= H \cdot H^H (H^H \ H)^{-1} \begin{bmatrix} s1 \\ s2 \end{bmatrix} + \begin{bmatrix} n1 \\ n2 \end{bmatrix}$$

$$= \begin{bmatrix} s1 \\ s2 \end{bmatrix} + \begin{bmatrix} n1 \\ n2 \end{bmatrix}$$

As is apparent from the equation (4), ZF filter taps w11 through w22 prevent the information symbol s2 of the system 2 from being included in the signal received by the receiver of system 1 and the information symbol s1 of the system 1 from being included in the signal received by the receiver of system 2. In this way, the processing on the transmission side enables interference cancellation on the reception side.

It is noted that, according to the foregoing, the calculation of transmit filters is performed at the system 1; however, the calculation of the transmit filters may be performed at the system 2. In addition, the work load of the calculation of the transmit filters may be shared between system 1 and system 2. In addition, TH preceding or the like other than the aforementioned transmission ZF may be used as an interference cancellation technique.

Figure 11:
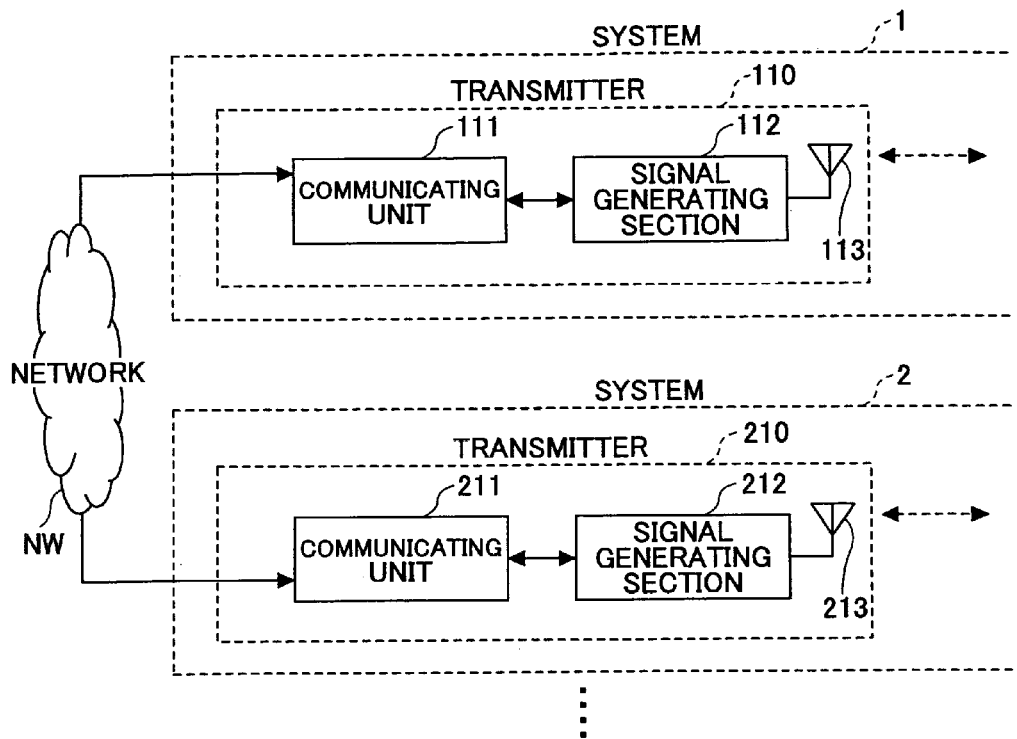
FIG. 11 is a diagram showing a configuration according to the second embodiment.

FIG. 11 is a diagram of the configuration according to the second embodiment of the present invention, in which radio communication such as Bluetooth communication is used as a communicating function of the communicating units 111, 211 . . . of the transmitters 110, 210 . . . of the systems 1, 2 . . . . It is noted that the configuration of the receiver is omitted in the drawing; however, the remaining part is the same as shown in FIG. 4.

The second embodiment is suited for the case where the transmitters 110, 210 . . . of the systems 1, 2 . . . are located at a short distance from each other. It is noted that infrared communication other than Bluetooth communication can be used.

Figure 12:
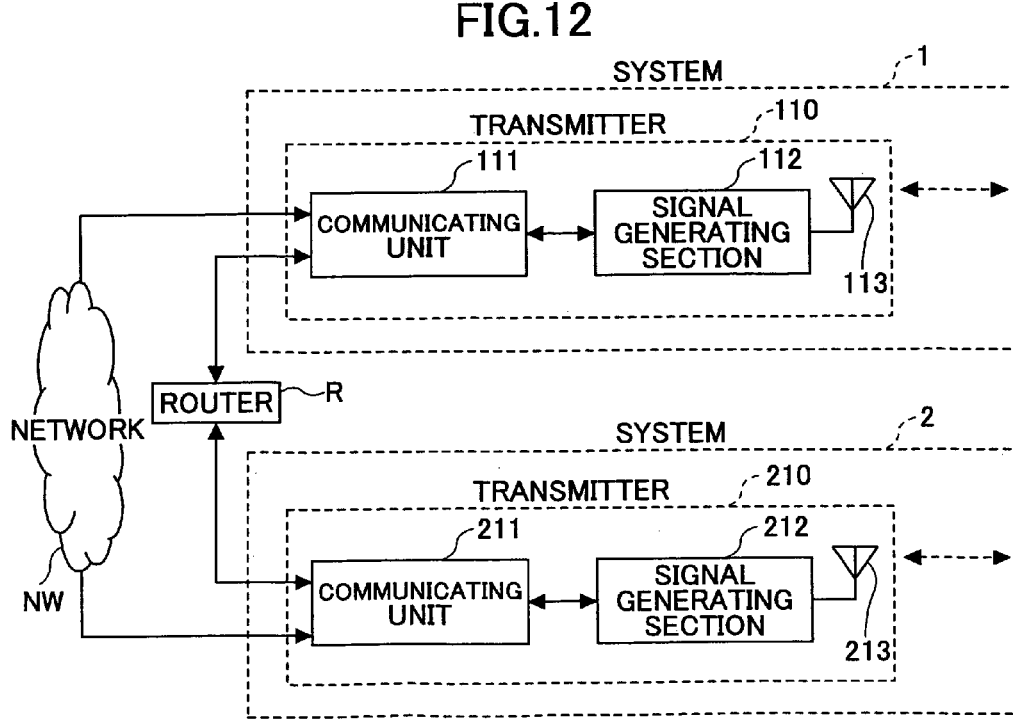
FIG. 12 is a diagram showing a configuration according to the third embodiment.

FIG. 12 is a diagram of the configuration according to the third embodiment of the present invention, in which wired communication via a router R is used as a communicating function of the communicating units 111, 211 . . . of the transmitters 110, 210 . . . of the systems 1, 2 . . . . It is noted that the configuration of the receiver is omitted in the drawing; however, the remaining part is the same as shown in FIG. 4.

In the third embodiment, the transmitters 110, 210 . . . of the systems 1, 2 . . . perform packet communication by wired communication link. Thus, the third embodiment is applicable in the case where the transmitters 110, 210 . . . of the systems 1, 2 . . . are not located at a short distance from each other.

Figure 13:
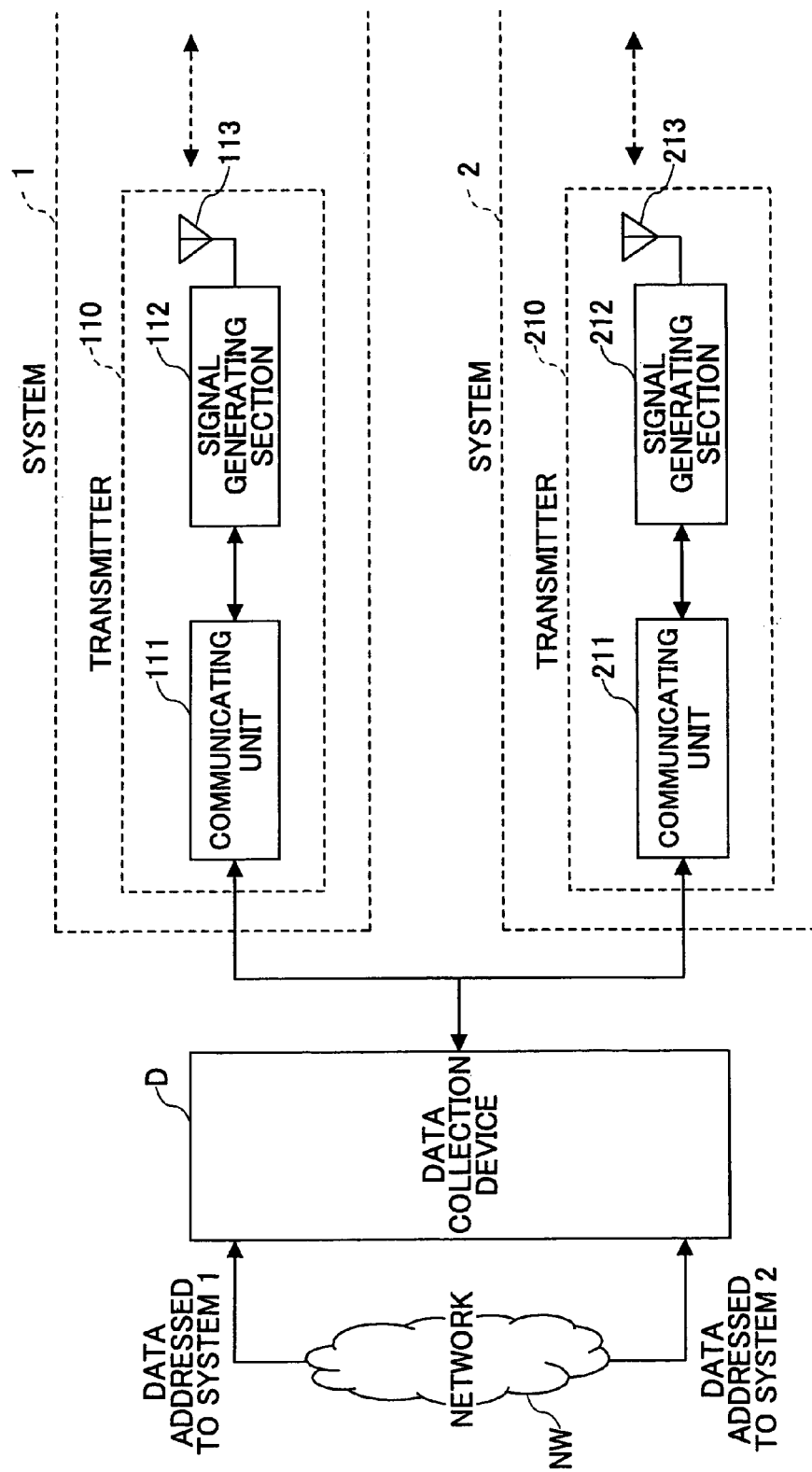
FIG. 13 is a diagram showing a configuration according to the fourth embodiment.

FIG. 13 is a diagram of the configuration according to the fourth embodiment of the present invention, in which a data collection device D is provided between the transmitters 110, 210 . . . of the systems 1, 2 . . . and the network NW, and the communicating function of the communicating units 111, 211 . . . is implemented by wired communication with the data collection device D. It is noted that the configuration of the receiver is omitted in the drawing; however, the remaining part is the same as shown in FIG. 4.

In the fourth embodiment, intercommunication of data is enabled by centrally collecting information of the respective systems 1, 2 . . . at the data collection device D and sharing the collected information between systems. In this case, the communication between systems is performed via the data collection device D, and the transmitters 110, 210 . . . of the systems 1, 2 . . . transmit pilot signals, estimated transmission path information, information symbols, etc., to the data collection device D. A ZF filter or the like is calculated in the data collection device D, and the calculation result is transmitted to the transmitters 110, 210 . . . of the systems 1, 2 . . . . In this way, it is possible to reduce the work load of processing in system 1, 2 . . . .

Figure 14:
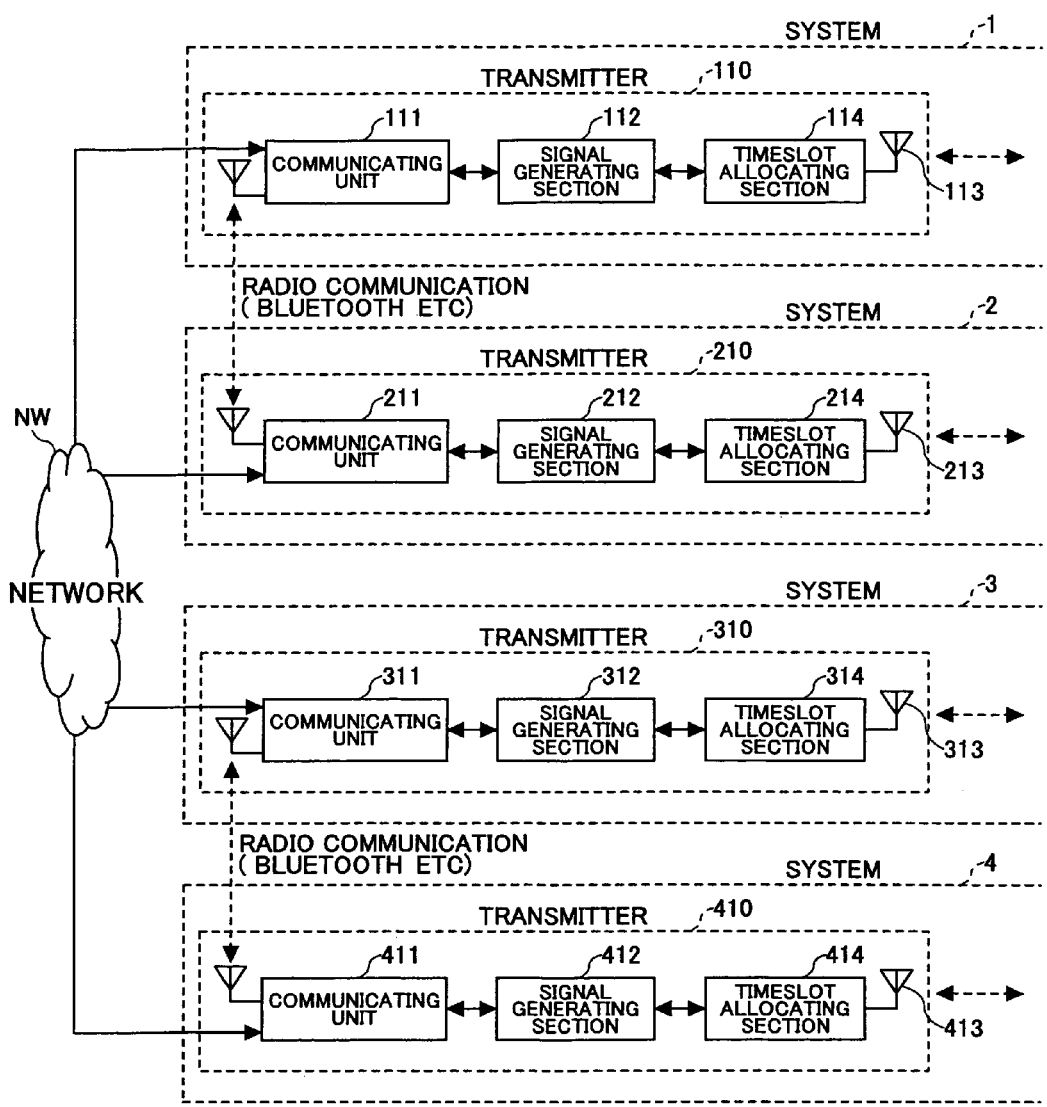
FIG. 14 is a diagram showing a configuration according to the fifth embodiment.

FIG. 14 is a diagram of the configuration according to the fifth embodiment of the present invention. In this embodiment, plural systems are divided into 2 groups, and communication within the group is performed using interference cancellation according to the present invention, while communication between the respective groups is performed according to the time division scheme in a conventional manner. More specifically, assuming that there are four systems as shown here, interference between system 1 and system 2 is prevented since communication is performed between the communicating unit 111 of the transmitter 110 of system 1 and the communicating unit 211 of the transmitter 210 of system 2. Similarly, interference between system 3 and system 4 is prevented since communication is performed between the communicating unit 311 of the transmitter 310 of system 3 and the communicating unit 411 of the transmitter 410 of system 4. On the other hand, transmissions between the group consisting of system 1 and system 2 and the group consisting of system 3 and system 4 are performed according to the time division scheme using protocols such as CSMA-CA by means of timeslot allocating sections 114 and 214 of the transmitters 110 and 210 of systems 1 and 2 and timeslot allocating sections 314 and 414 of the transmitters 310 and 410 of systems 3 and 4. It is noted that the configuration of the receiver is omitted in the drawing; however, the remaining part is the same as shown in FIG. 4.

Figure 15:
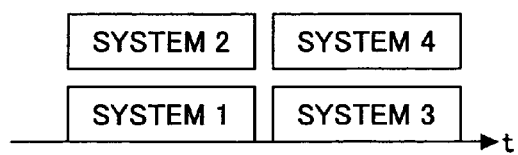
FIG. 15 a diagram showing a frequency use situation by each system on a time axis according to the fifth embodiment.

FIG. 15 is a diagram showing a frequency use situation by each system on a time axis according to the fifth embodiment. It is shown that although transmission between the group consisting of system 1 and system 2 and the group consisting of system 3 and system 4 is performed according to the time division scheme, two systems of the respective group can simultaneously use the same frequency band without any interference.

Figure 16:
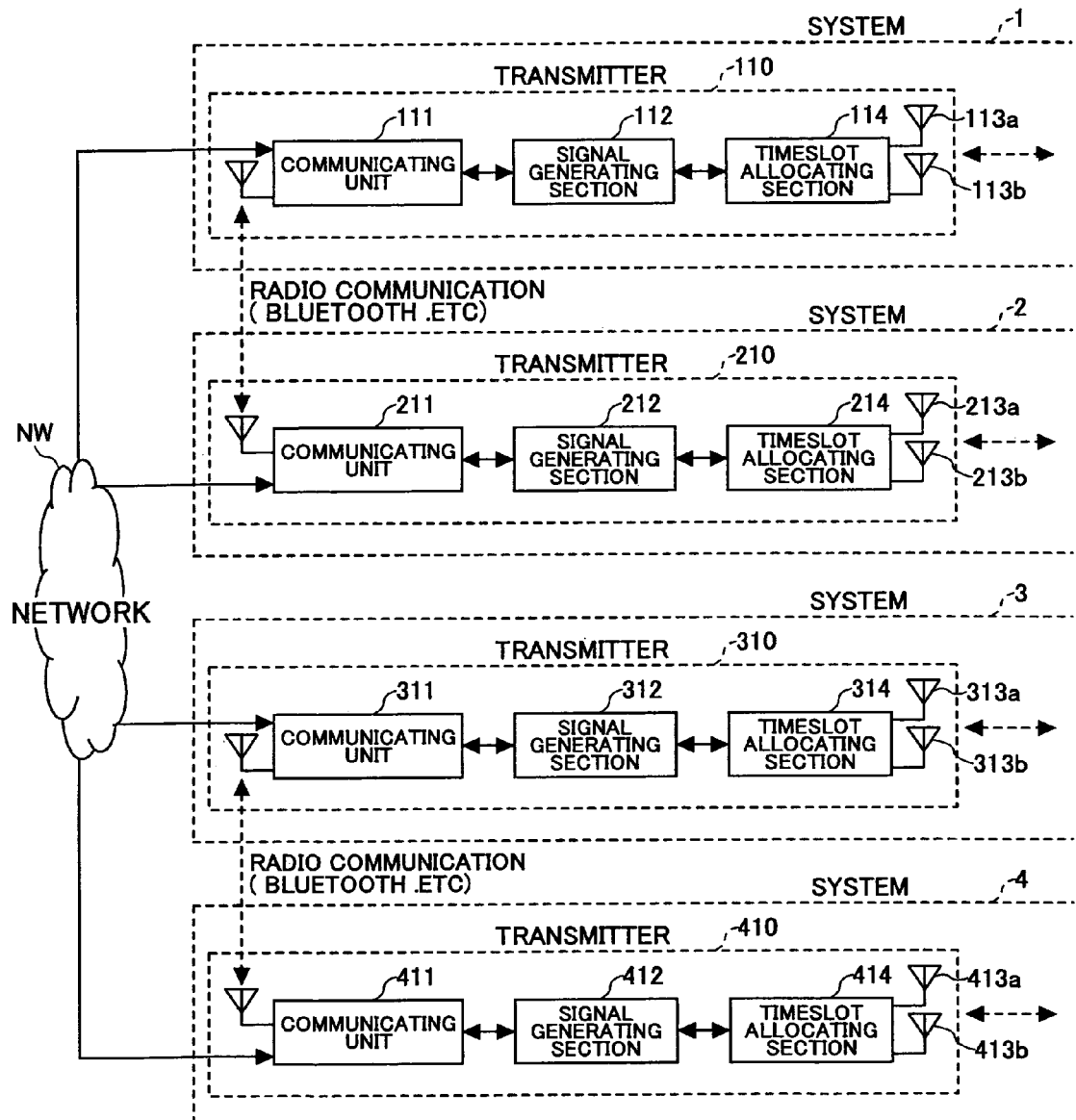
FIG. 16 is a diagram showing a configuration according to the sixth embodiment.
Figure 17:
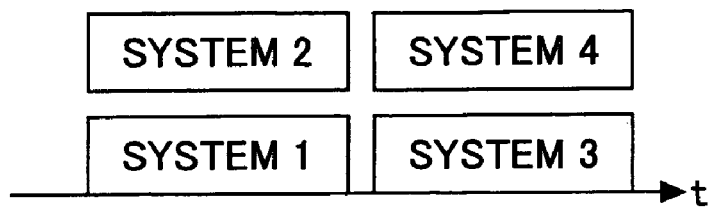
FIG. 17 is a diagram showing a frequency use situation by each system on a time axis according to the sixth embodiment.

FIG. 16 is a diagram of the configuration according to the sixth embodiment of the present invention, in which the present invention is applied to the case where the transmitters 110 through 410 of the systems 1 through 4 are provided with two antennas 113a, 113b . . . . In this way, even in the case where the respective systems are provided with plural antennas, it is possible to use an interference cancellation technique such as transmission ZF through cooperation between systems, thereby enabling further increases in communications capacity. It is noted that the remaining part is the same as shown in FIG. 4. In addition, FIG. 17 is a diagram showing a frequency use situation by each system on a time axis according to the sixth embodiment.

The present invention is disclosed with reference to the preferred embodiments. However, it should be understood that the present invention is not limited to the above-described embodiments, and variations and modifications may be made without departing from the scope of the present invention.

This patent application is based on and claims the benefit of the earlier filing date of Japanese Patent Application No. 2004-258472 filed Sep. 6, 2004, the entire contents of which are hereby incorporated by reference.

What is claimed is:

1. A shared frequency transmitter for use in a network environment where transmitters and receivers of plural radio communication systems in which the same frequency is used exist, comprising:

a communicating unit configured to detect peripheral transmitters existing in a peripheral area, and to exchange information with the detected peripheral transmitters in advance regardless of whether interference is detected; and a signal generating unit configured to generate a transmit signal by applying an interference cancellation technique, which does not include a time division technique and depends on the information obtained through the exchange of information, wherein the communicating unit is configured to transmit a search signal to the peripheral transmitters, and if the communicating unit receives an acknowledgement signal which is a response to the search signal from the peripheral transmitters, the communicating unit transmits information including a pilot symbol to the peripheral transmitters, receives information including pilot signals from the peripheral transmitters, and passes the received information to the signal generating unit for use in the interference cancelation technique.

2. The shared frequency transmitter of claim 1, wherein the communicating unit exchanges the information with the peripheral transmitters via wireless communication media.

3. The shared frequency transmitter of claim 1, wherein the communicating unit exchanges the information with the peripheral transmitters via wired-communication media.

4. The shared frequency transmitter of claim 1, wherein the communicating unit exchanges the information with the peripheral transmitters centrally, using a data collection device provided on the network and configured to collect the information to be exchanged.

5. The shared frequency transmitter of claim 1, wherein the respective transmitters are divided into plural groups by system and the communicating unit exchanges the information with a particular group of transmitters among the plural groups of transmitters.

6. The shared frequency transmitter of claim 1, wherein the information to be exchanged includes at least one of an information bit string, transmission path information, synchronization information, information on the method of generating signals, and a parameter required to generate the transmit signal.

7. The shared frequency transmitter of claim 1, wherein the information to be exchanged includes at least one of information on a modulation scheme, information on a radio-frequency bandwidth, and information on a center frequency.

8. The shared frequency transmitter of claim 1, wherein a parameter required to generate the transmit signal is calculated by one or more of the transmitters on the network.

9. The shared frequency transmitter of claim 1, wherein a parameter required to generate the transmit signal is calculated by a data collection device provided on the network.

10. The shared frequency transmitter of claim 1, further comprising:
    means for integrating pilot signals of the respective systems into the information to be exchanged;
    means for estimating direct transmission path information concerning a transmission path having the transmitter of its own at one end based on the pilot signals; and
    means for acquiring indirect transmission path information concerning the transmission path not having the transmitter of its own at one end from other systems,
    wherein the transmit signal is generated by applying an interference cancellation technique based on the direct transmission path information and the indirect transmission path information.

11. A method of transmission with a shared frequency in a network environment where transmitters and receivers of plural radio communication systems in which the same frequency is used exist, comprising:
    detecting peripheral transmitters existing in a peripheral area;
    exchanging predetermined information with the detected peripheral transmitters in advance regardless of whether interference is detected; and
    generating a transmit signal by applying an interference cancellation technique, which does not include a time division technique and depends on the information obtained through the exchanging, wherein
    the detecting includes transmitting a search signal to the peripheral transmitters, and
    the exchanging includes receiving an acknowledgement signal which is a response to the search signal from the peripheral transmitters, transmitting information including a pilot symbol to the peripheral transmitters, receiving information including pilot signals from the peripheral transmitters, and passing the received information to the signal generating unit for use in the interference cancelation technique.

12. The method of claim 11, wherein the information to be exchanged includes at least one of an information bit string, transmission path information, synchronization information, information on the method of generating signals, and a parameter required to generate the transmit signal.

13. The method of claim 11, wherein the information to be exchanged includes at least one of information on a modulation scheme, information on a radio-frequency bandwidth, and information on a center frequency.

* * * * *